A. F. SCHADE.
BIT BRACE CHUCK.
APPLICATION FILED AUG. 1, 1910.
995,808.
Patented June 20, 1911.
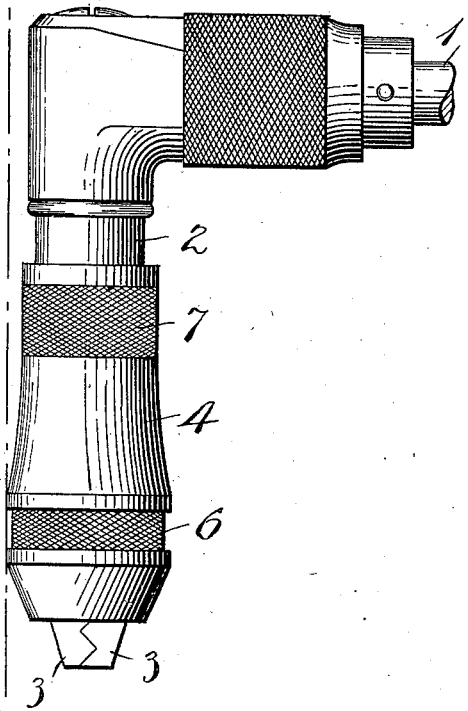
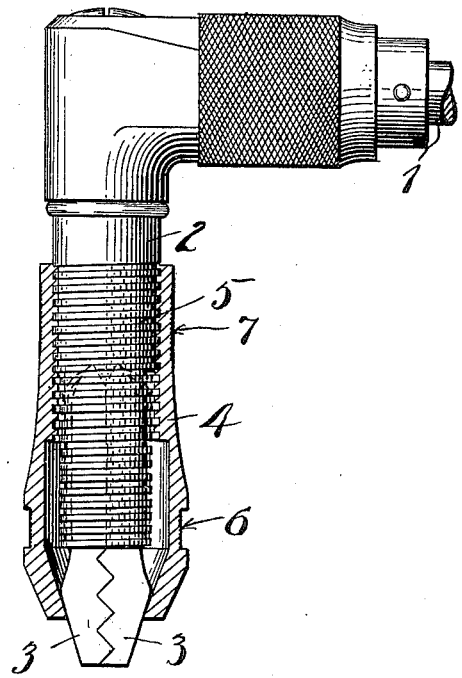

UNITED STATES PATENT OFFICE.

ALBERT F. SCHADE, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

BIT-BRACE CHUCK.

995,808.     Specification of Letters Patent.     Patented June 20, 1911.

Application filed August 1, 1910. Serial No. 574,766.

*To all whom it may concern:*

Be it known that I, ALBERT F. SCHADE, a citizen of the United States, residing at New Britain, county of Hartford, State of Connecticut, have invented certain new and useful Improvements in Bit-Brace Chucks, of which the following is a full, clear, and exact description.

My invention relates to improvements in chucks for bit braces and particularly to the construction of the sleeve for controlling the chuck jaw.

In the drawings Figure 1 is a side elevation of part of a bit brace illustrating my invention. Fig. 2 is a similar view, but partly in section.

1 represents a part of bow of the bit brace.

2 represents the driver head for the chuck.

3—3 represents the chuck jaws.

4 represents the jaw controlling sleeve. In the type of chuck shown herein, the sleeve 4 is threaded at 5 on the chuck head 2 and, in order to afford the proper grip for the hand on the jaw controlling sleeve, the forward or outer end of said sleeve 4 is increased in diameter, and provided with a knurled portion 6 at said largest diameter, and another knurled portion 7, if desired. The knurled portion 6 is formed in the bottom of a sunken channel extending around the sleeve, said channel being set back to such an extent that the roughened part will stand below the smooth adjacent surface of the sleeve and yet not sufficiently below the same so as to prevent the operator from gripping said knurled portion with his hand in the act of setting up the chuck jaws. A substantial advantage is gained by this construction in that in use it provides upon the rotatable shell at its greatest diameter a knurled gripping portion, which at the same time is properly guarded against coming in contact with and injuring the surface of any woodwork adjacent thereto. It is a well known common fault in bit brace chucks of this type that great care must be taken in certain places to avoid marring the woodwork with the knurled portion of the chuck. Carelessness or accidental slipping of the tool frequently results in serious injury to the finished surfaces adjacent to the chuck. By this very simple expedient I have succeeded in overcoming entirely this fault, and have eliminated thereby all possibility of injury from the aforesaid cause.

What I claim is:

In a chuck for bit braces and the like, two chuck jaws, a tubular rotatable controlling sleeve for said jaws, said sleeve being of varying diameter largest at a point near its forward end, said sleeve having an annular channel extending around the same at its largest diameter, the bottom of said channel being roughened, that part of the sleeve on each side of the channel being smooth.

ALBERT F. SCHADE.

Witnesses:
H. S. WOLTER,
W. J. WORAM.

Copies of this patent may be obtained for five cents each, by addressing the "Commissioner of Patents, Washington, D. C."